United States Patent [19]

Kasim et al.

[11] Patent Number: 5,577,858

[45] Date of Patent: Nov. 26, 1996

[54] PIN-RETAINING STRUCTURE AND METHOD FOR RETAINING A PIN

[75] Inventors: Rikos A. Kasim, Mukwonaga; Darryl R. Immel, Waterford, both of Wis.

[73] Assignee: Harnischfeger Corporation, Brookfield, Wis.

[21] Appl. No.: 429,597

[22] Filed: Apr. 27, 1995

[51] Int. Cl.⁶ .................................. B25G 3/00; F16D 1/12; F16D 3/00; F16C 11/00

[52] U.S. Cl. .................. 403/316; 403/79; 403/97; 403/157; 403/348

[58] Field of Search .................. 403/79, 78, 315, 403/316, 317, 318, 157, 158, 150, 154, 161, 348, 349, 297, 298, 294, 326; 287/100

[56] References Cited

U.S. PATENT DOCUMENTS

| 3,606,406 | 9/1971 | Walters | 287/20 |
| 4,337,614 | 7/1982 | Briscoe | 59/86 |

FOREIGN PATENT DOCUMENTS

| 0172006 | 8/1985 | European Pat. Off. |
| 1566406 | 12/1967 | France. |
| 23655 | 3/1911 | United Kingdom. |
| 382448 | 10/1932 | United Kingdom. |

*Primary Examiner*—Blair Johnson
*Assistant Examiner*—Bruce A. Lev
*Attorney, Agent, or Firm*—Jansson & Shupe, Ltd.

[57] ABSTRACT

An apparatus such as a digging bucket has a clevis device pivotably connected thereto by a pin held in place by a pin-retaining structure. The clevis includes a plurality of arcuate, lip-like, outwardly-radially-projecting first retention members and the structure includes a cap portion having a plurality of arcuate, lip-like, inwardly-radially-projecting second retention members. Each second retention member engages and "locks" to a separate first retention member. The cap portion, which interferes with free axial travel of the pin, is well secured so that the pin is retained in engagement with the clevis without welding the pin. Avoiding pin welding permits using a substantially-harder pin, resulting in significantly better wear characteristics. A new method for retaining a pin is also disclosed.

16 Claims, 9 Drawing Sheets

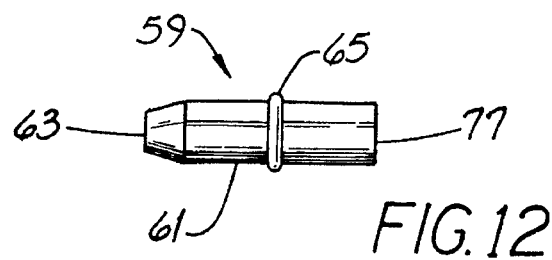
FIG. 12
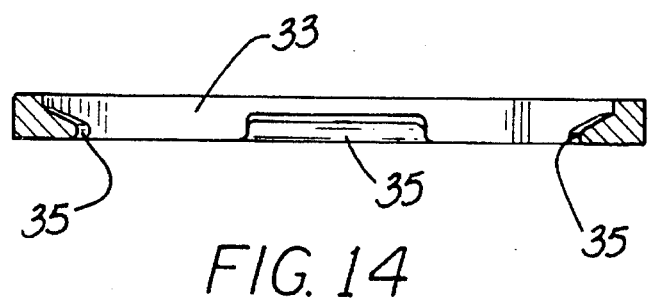
FIG. 14
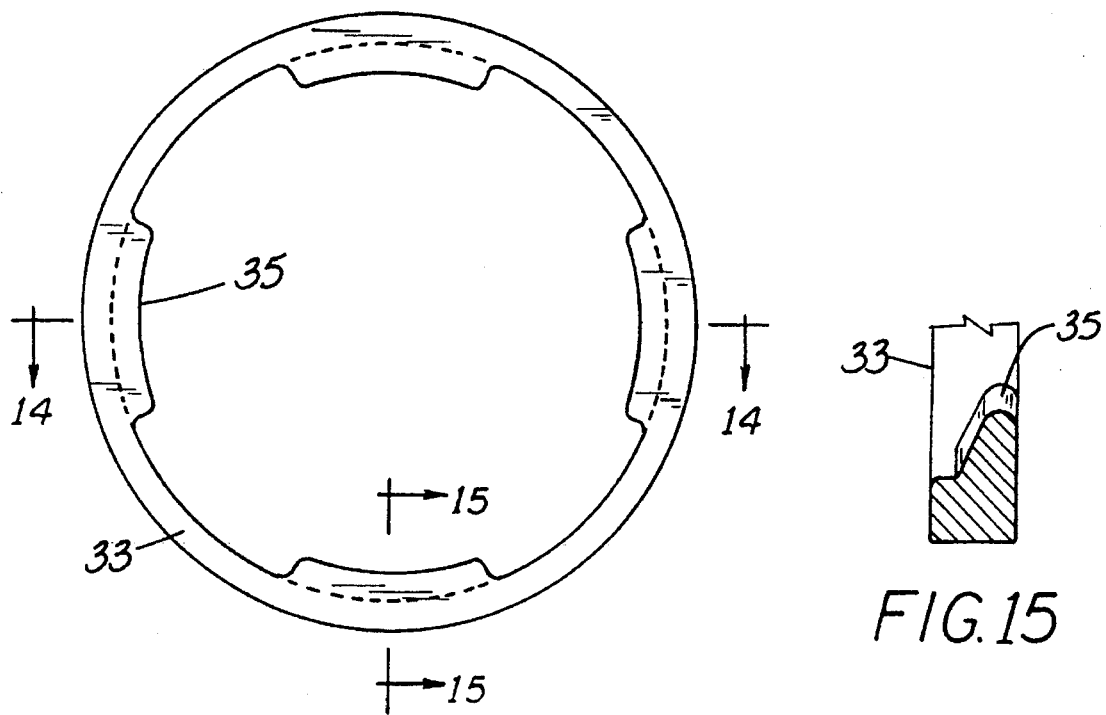
FIG. 13
FIG. 15

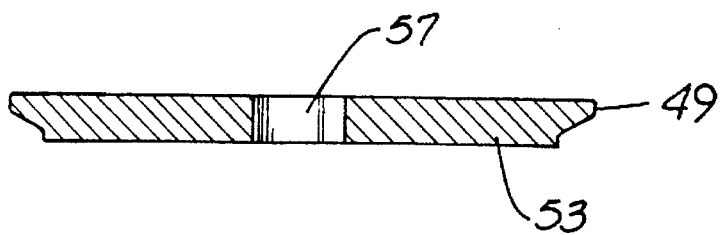
FIG. 17
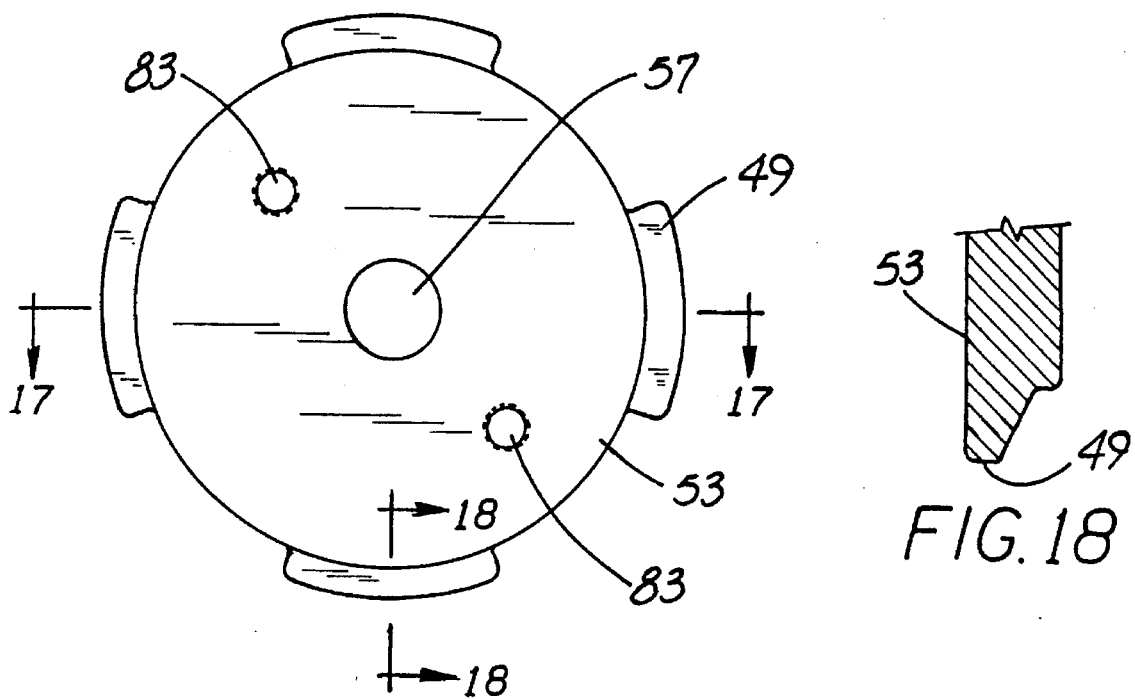
FIG. 18
FIG. 16

PIN-RETAINING STRUCTURE AND METHOD FOR RETAINING A PIN

FIELD OF THE INVENTION

This invention relates generally to joints and connections and, more particularly, to joints and connections having relatively-movable members pin-connected to one another.

BACKGROUND OF THE INVENTION

Many types of machines and machine accessories have components which move relative to one another or to some other part of the machine. Components involving linear or pivoting relative movement are abundant.

One type of machine having parts involving relative pivoting movement is known as a dragline, a type of excavating machine equipped with an extending boom from which is suspended a digging bucket. To excavate, the bucket is placed on the ground away from the machine. With its teeth rearward (facing the machine), such bucket is drawn (or "dragged") toward such machine by taut cable. When the bucket is filled, it is hoisted by other taut cables and the machine is then rotated to dump the bucket contents on a spoil pile.

During digging and later bucket emptying, such bucket must assume a variety of "attitudes," i.e., a horizontal position to dig and a steeply-angled or vertical position to empty. The hoisting cables are attached to chain-link "rigging" which, in turn, is attached to the bucket by U-shaped clevises. The use of such pivoting clevises permits the bucket to be supported by the rigging and the hoisting cables and yet assume the positions required for digging and bucket emptying.

Bucket-clevis attachment is by a pivot pin extending through both "legs" of the clevis and through the bucket. The bucket, clevis and pin are subjected to extraordinary wear and impact. (In fact, it is difficult to envision the rigors of bucket service without actually having seen a dragline in operation.) By reason of such very hard service, it is preferred that the pin have a relatively-high hardness for longer pin life.

It is also important that the pivot pin be securely retained so that the bucket and clevis do not separate from one another. But when the pin is worn to the point that it must be replaced, the structure retaining such pin is preferably quick and easy to remove and replace. A large dragline may represent a capital expenditure of several million dollars—machine downtime is very expensive.

While generally satisfactory, prior art arrangements for retaining a pin have some deficiencies with respect to pin hardness (and consequent "wearability") and ease of pin replacement. In one arrangement, one end of the cylindrical pivot pin is fitted with a cap-like head that prevents such pin from working its way out of the clevis in one direction. Such head is welded to the pin. After the bucket and rigging are assembled in the field, a similar head is welded to the other end of the pin to prevent the pin from working its way out of the clevis in the other direction.

There are two disadvantages to this approach. One is that to replace a pin, one has to "cut" the welded head from at least one end of the pin (by using an acetylene torch, for example) and weld a head on an end of the replacement pin after such pin is installed. This is time consuming and requires that flame cutting equipment and a person skilled as a welder be available on the site.

Another disadvantage to the "welded head" approach is that the hardness of the pin cannot exceed some maximum, e.g., about 400–450 Brinell. A pin of such hardness does not wear as well as desired and it must be replaced with a frequency that with the advent of the invention is unnecessary.

Another approach to pin retention involves using a cylindrical pin without welded heads and mounting a cover at each side of the clevis and over each end of the pin. The cover mounts tongue-and-groove fashion on straight tracks affixed to the clevis. After being properly positioned, the covers are welded in place.

While this approach avoids pin welding (and therefore permits using a pin having a hardness of about 650 Brinell), it does not avoid welding altogether. As a consequence, the user of such approach is likely to experience at least some of the downtime and equipment and personnel problems mentioned above.

An improved pin-retaining structure and method which avoid welding when installing or replacing a pin in the field, which reduce downtime and which involve only commonly-available tools and personnel skills would be an important advance in the art.

OBJECTS OF THE INVENTION

It is an object of the invention to provide an improved pin-retaining structure and related method that overcome some of the problems and shortcomings of the prior art.

Another object of the invention is to provide an improved pin-retaining structure and related method which avoid welding when installing or replacing a pivot pin in the field.

Another object of the invention is to provide an improved pin-retaining structure and related method which help reduce machine downtime.

Still another object of the invention is to provide an improved pin-retaining structure and related method requiring only commonly-available tools.

Another object of the invention is to provide an improved pin-retaining structure and related method requiring readily-available personnel skills.

Yet another object of the invention is to provide an improved pin-retaining structure and related method which are quick and easy to use. How these and other objects are accomplished will become apparent from the following descriptions and from the drawings.

SUMMARY OF THE INVENTION

The invention involves an apparatus of the type having a device pivotably connected thereto by a pin and also having a pin-retaining structure. For purposes of explanation of its principles, the invention is described in connection with a digging bucket apparatus having a clevis "pin-attached" to it.

In the improvement, the device includes a plurality of arcuate first retention members. The structure has a cap portion equipped with a plurality of second retention members. Each second retention member engages and "locks to" a separate first retention member. Since the structure is configured to interfere with free axial travel of the pin when such structure is mounted, the pin is retained in engagement with the device.

The pin is weld-free in that no welding need be performed on the pin to retain it in the apparatus. Since welding on the pin is avoided, the pin can be made of much harder material than is practical with welded pin retention schemes.

More specifically, the pin extends along an axis and the first retention members project generally radially with respect to the axis. In the preferred embodiment, such members project away from such axis and the second retention members project oppositely, i.e., generally toward the axis and interlock with the first retention members. In a less preferred embodiment, the first and second retention members project toward and away from the axis, respectively.

In the highly-preferred embodiment, the first retention members are arranged along and define a first circle. The second retention members define a second circle having a diameter substantially equal to that of the first circle.

The invention offers benefits even when used at only one end of a pin. However, such invention is most advantageous when used at both ends of a pin to be retained. In such an arrangement, there is a separate cap portion mounted adjacent to each end of the pin being retained. The dimension between the cap portions is slightly greater than the length of the pin so that the pin has limited freedom of movement between the cap portions.

Since there is some propensity for the cap portion to become detached from the apparatus, it is preferred that the apparatus include a locking component engaging such portion. In one preferred embodiment, the component includes a short rod which extends into clearance holes in the device and in the cap portion. Such rod is grooved about at the mid-point along its length and an annular countersink cavity is formed in either the cap portion or the device for holding a snap ring.

The rod is driven in through one of the clearance holes until the groove is in registry with the snap ring. Thereupon, the snap ring "pops" into the groove and prevents the rod from moving out of the holes. The locking component prevents substantial movement, i.e., substantial rotational movement, of the cap portion with respect to the first retention members.

Another aspect of the invention involves a method for retaining a pin on an apparatus having a device pivotably coupled thereto by such pin. The new method includes the steps of providing a device having a plurality of first retention members spaced from a device surface. A cap portion is provided which has a plurality of second retention members. A separate second retention member is rotatably positioned between each first retention member and the surface, thereby retaining the pin in engagement with the device.

In a more specific aspect of the method, the positioning step includes rotating the cap portion with respect to the device. To prevent the cap portion from detaching, the method also includes the step of engaging the cap portion with a locking component, thereby preventing substantial movement of the cap portion with respect to the device.

Other details of the invention are set forth in the following detailed description and in the drawings.

BRIEF DESCRIPTION OF THE DRAWINGS

FIG. 12 is a side elevation view of the locking component used with the new structure.

FIG. 13 is another embodiment of the body shown in FIGS. 3 and 6. Certain surfaces are shown in dashed outline.

FIG. 14 is a cross-section view of the body of FIG. 13 taken generally along the viewing plane 14—14 thereof.

FIG. 15 is a cross-section view of the body of FIG. 13 taken generally along the viewing plane 15—15 thereof.

FIG. 16 is a plan view of another embodiment of the cap portion of the new structure. Surfaces of parts are shown in dashed outline.

FIG. 17 is a section view of the cap portion of FIG. 16 taken generally along the viewing plane 17—17 thereof.

FIG. 18 is a section view of the cap portion of FIG. 16 taken generally along the viewing plane 18—18 thereof. Parts are broken away.

DETAILED DESCRIPTIONS OF PREFERRED EMBODIMENTS

Figure 1:
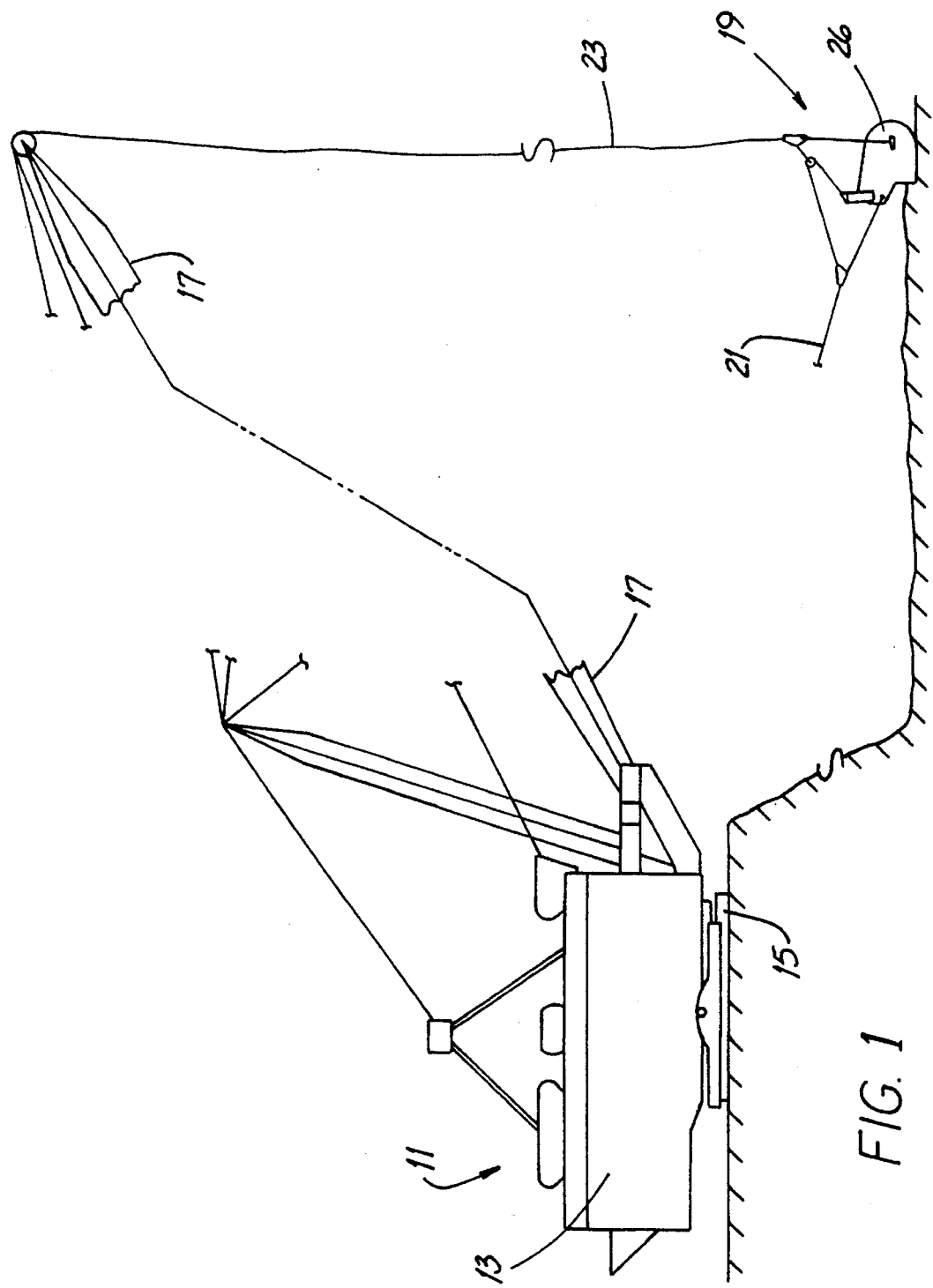
FIG. 1 is a representative view with parts broken away of an excavating dragline.
Figure 2:
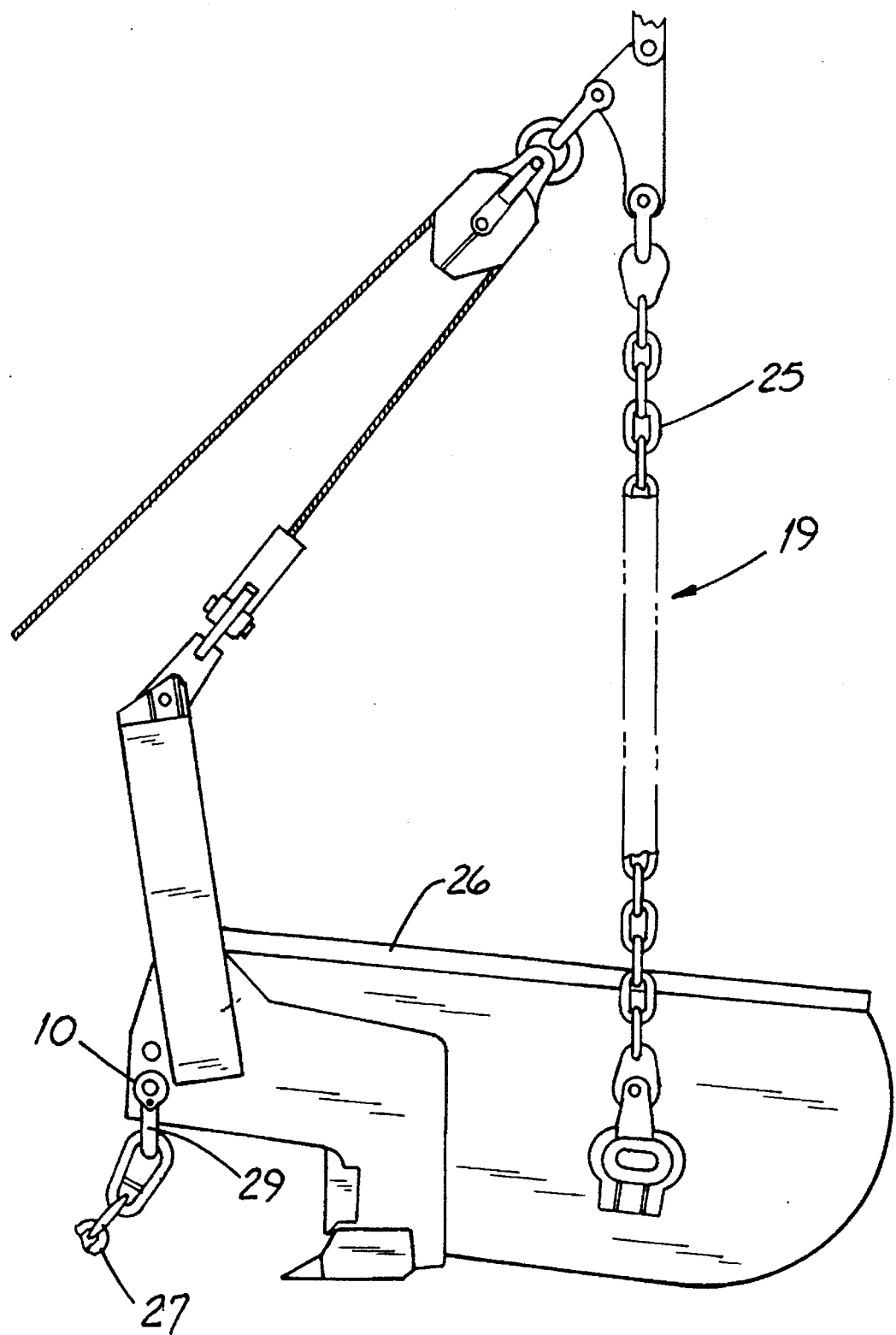
FIG. 2 is a side elevation view of a bucket apparatus used with the dragline of FIG. 1.

Before describing the new pin-retaining structure 10 and method for retaining a pin, it will be helpful to have an understanding of one type of machine that benefits from the invention. Referring to FIGS. 1 and 2, the machine 11 is an exemplary dragline having an upper machinery housing 13 which pivots on a base 15. The extended boom 17 supports and manipulates a digging bucket apparatus 19 which, in preparation for digging, is placed away from the machine as generally shown in FIG. 1.

As the rear-facing apparatus 19 is drawn toward the machine 11 by the cable 21, such apparatus 19 fills with rock, earth, coal or the like. And when it is filled, the apparatus 19 is hoisted by the cable 23 and the machine 11 pivoted in one direction or the other so that the contents of the bucket 26 may be placed on a spoil pile.

Figure 5:
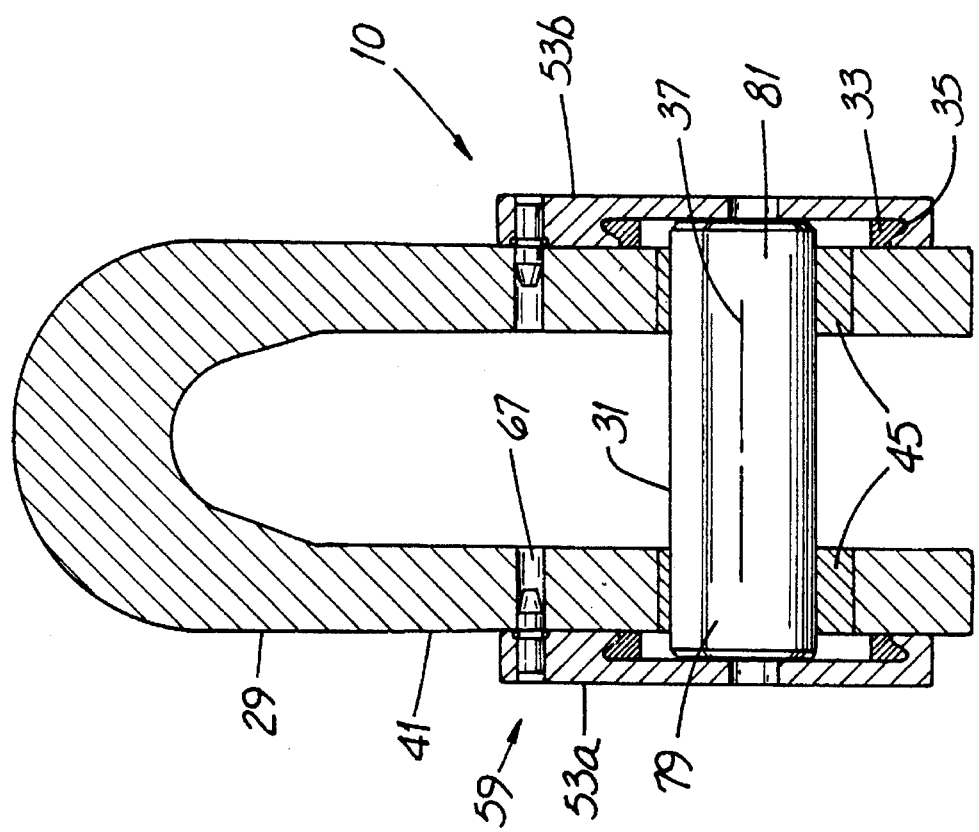
FIG. 5 is an elevation view, partly in section, of another representative clevis device equipped with the new pin-retaining structure. Surfaces of parts are shown in dashed outline.
Figure 4:
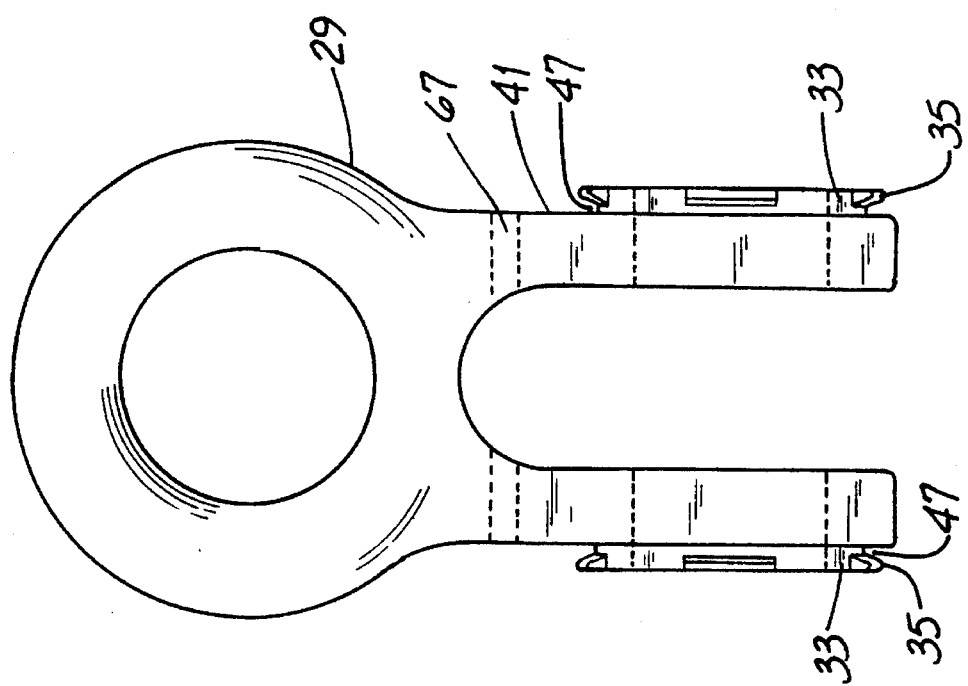
FIG. 4 is an elevation view of a representative clevis device which may be used with the bucket of FIG. 2. Surfaces of parts are shown in dashed outline.
Figure 7:
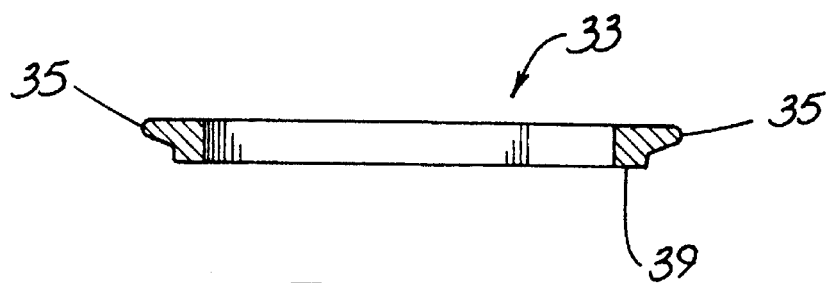
FIG. 7 is a cross-section view of the body of FIG. 6 taken generally along the viewing plane 7—7 thereof.
Figure 8:
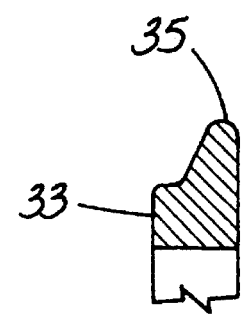
FIG. 8 is a cross-section view of the body of FIG. 6 taken generally along the viewing plane 8—8 thereof.
Figure 6:
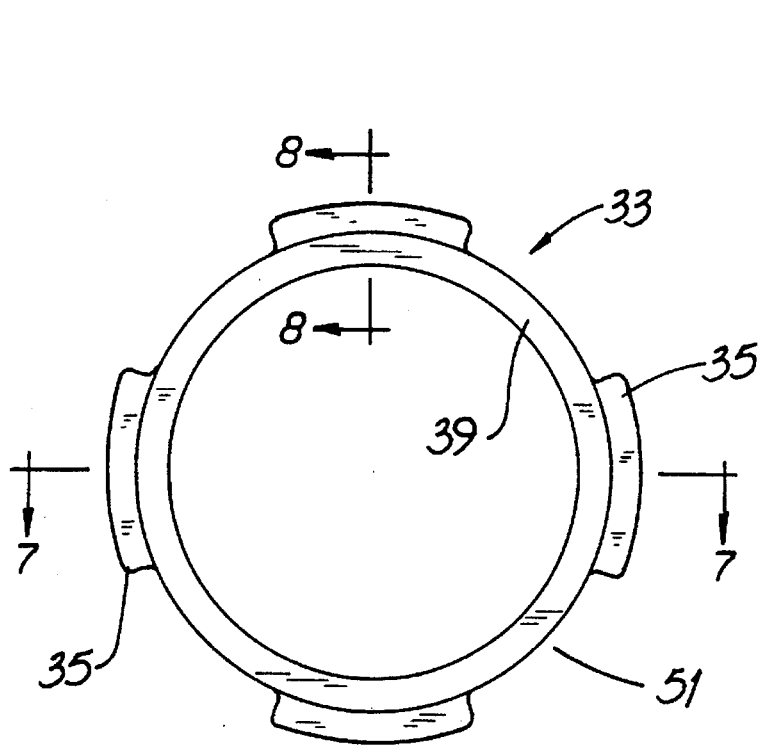
FIG. 6 is a plan view of the ring-like body of the new structure taken generally along the viewing axis VA6 of FIG. 3.
Figure 10:
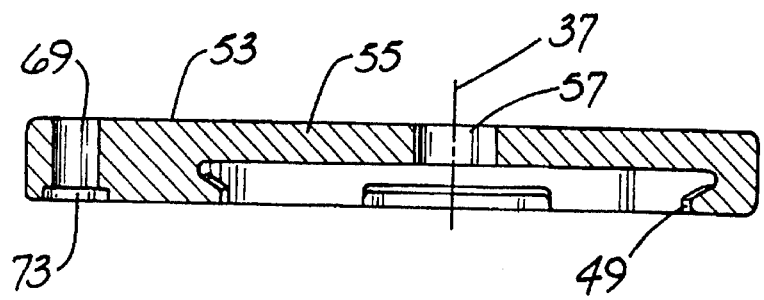
FIG. 10 is a cross-section view of the cap portion of FIG. 9 taken generally along the viewing plane 10—10 thereof.
Figure 11:
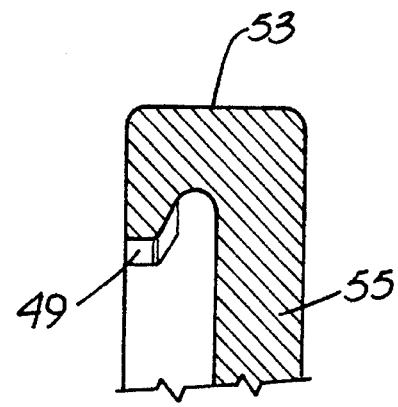
FIG. 11 is a cross-section view of the cap portion of FIG. 9 taken generally along the viewing plane 11—11 thereof. Parts are broken away.

Referring particularly to FIGS. 2, 4, and 5 the bucket apparatus 19 includes rigging 25 used to suspend the bucket 26 from the cable. Other rigging 27, used to drag the bucket 26, is attached to such bucket 26 by a pivoting clevis device 29. A pivot pin 31 secures the device 29 and the bucket 26 to one another. Details of the inventive pin-retaining structure 10 will now be set forth.

Referring next to FIGS. 3 through 8, the pin-retaining structure 10 includes a ring-like body 33 having a plurality of arcuate "lip-like" first retention members 35 projecting radially outward from the pin axis 37. The body 33 may be made as a separate component attached to the clevis device 29 by welding during manufacture. Or such body 33 may be integrally cast with the device 29.

In the former approach, the surface 39 of the body 33 is that which is placed against the face 41 of the device 29 before applying the welds. And whether the body 33 is cast integrally with the device 29 or welded thereto, the opening 43 in the body is to be sufficiently large to accommodate insertion of the pin bushings 45.

FIGS. 4 and 5 illustrate that the first retention members 35 are spaced from the face 41 of the device 29. Such members 35 and face 41 define notch-like spaces 47 (four spaces 47 in the illustrated embodiment), each of which is occupied by a separate second retention member 49 as described below.

Figure 3:
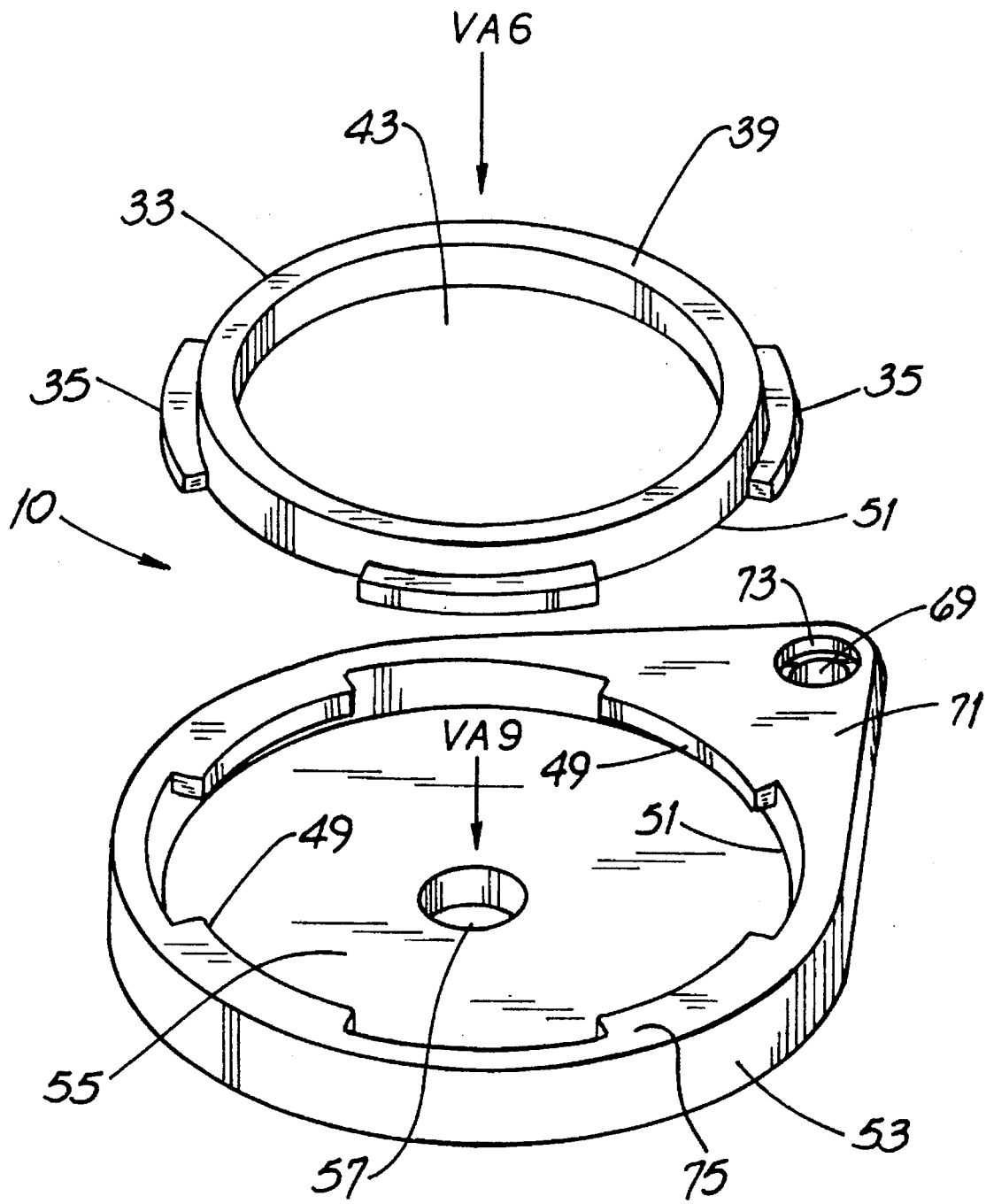
FIG. 3 is a perspective view of the body and cap portions of one embodiment of the new pin-retaining structure.

In the embodiment of FIG. 3, the four retention members 35 or 49 and the four gaps 51 between such members 35 or 49 each span an arc of about 45°. However, other arrangements are certainly contemplated by the invention. For example (and as expressed in mathematical terms), the body may include X retention members and X gaps, each spanning an arc of about 360° divided by 2x. And, of course, non-symmetrical arrangements are possible.

Referring next to FIGS. 3, 5 and 9 through 11, details of the cap portion 53 of the pin-retaining structure 10 will now be described. Such cap portion 53 has a plurality of second retention members 49 which project radially inward toward the pin axis 37.

In a highly-preferred embodiment, the number of second retention members 49 and the number of gaps 51 between such members 49 is equal to the number of members 35 and gaps 51, respectively, of the device-attached body 33. And like the body 33, the cap portion 53 may include three retention members 49 and three gaps 51, each spanning an arc of about 60° or may include, say, twelve retention members 49 and twelve gaps 51, each spanning an arc of about 15°.

The cover 55 of the cap portion 53 may be imperforate or may have an aperture 57 (such as a coring aperture) therethrough. If the latter, such aperture 57 should be sufficiently small and/or positioned in such a way that the cover 55 limits the free axial travel of the pin 31, i.e., travel left-right as viewed in FIG. 5.

It will be recalled that draglines and their bucket apparatus 19 are subjected to particularly severe service. Abrading rock, gravel and the like frequently contact and abrade the exposed surfaces of the clevis device 29. For that reason, it is preferred that the cap portion 53 be positively retained in position. A locking component 59 is provided for the purpose.

Referring to FIGS. 5 and 12, the locking component 59 includes a generally-cylindrical rod 61, one end 63 of which is tapered to facilitate installation as described below. The rod 61 has an annular groove in which a snap ring 65 is seated when the rod 61 is installed. The rod 61 extends into openings described below.

Figure 9:
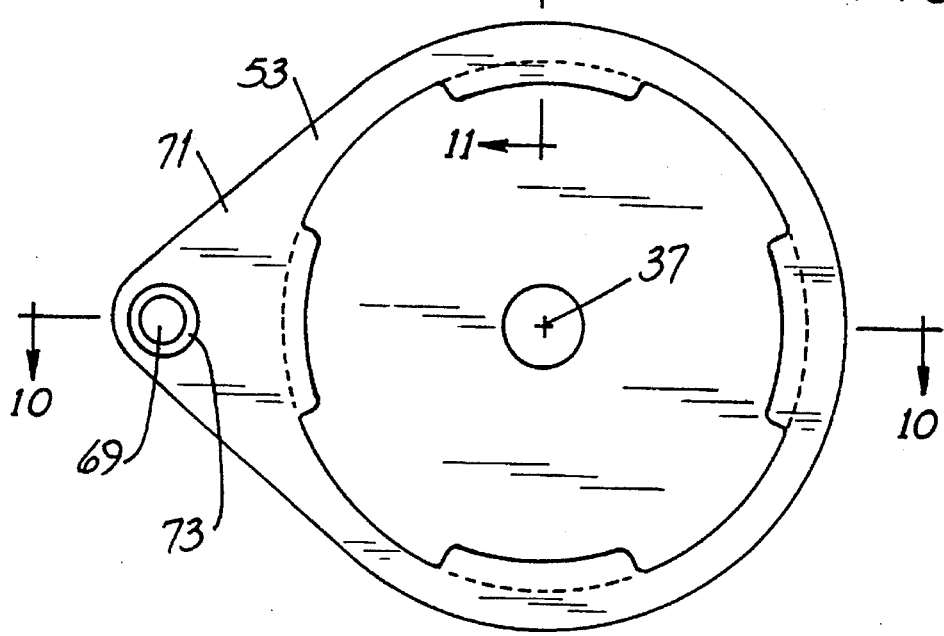
FIG. 9 is a plan view of the cap portion of the new structure taken generally along the viewing axis VA9 of FIG. 3. Surfaces of parts are shown in dashed outline.

Referring now to FIGS. 3, 5 and 9, a highly-preferred embodiment of the structure 10 has an opening 67 in the clevis device 29 and a "mating" opening 69 in the locking member 71 of the cap portion 53. The openings 67 and 69 generally correspond in size one to the other and are sized to receive the rod 61 with slight clearance. When the cap portion 53 is in place so that its retention members 49 and the first retention members 35 are interlocked and engaged with one another, such openings 67, 69 are in registry with one another.

An annular pocket 73 is formed in either the clevis device 29 or the locking member 71; the latter arrangement is illustrated in FIGS. 3, 5, 9 and 10. Prior to assembling the cap portion 53 to the body 33, a snap ring 65 is placed in the pocket 73 and retained there when the surface 75 of the cap portion 53 is brought to contact with the face 41 of the clevis device 29. Ring retention may be by caulking the ring 65 in place or by making such ring 65 magnetic.

To make the above-described surface 75 to face 41 contact, each second retention member 49 is aligned with a separate gap 51 between two of the first retention members 35. While maintaining such alignment, the cap portion 53 is moved toward and into contact with the device 29.

To lock the cap portion 53 into place, such portion 53 is rotated with respect to the device 29 and thereby position a separate second retention member 49 between each first retention member 35 and the face 41. As a result of such rotation, the opening 67 in such portion 53 will be brought into registry with the opening 69 in the device 29. (With the specific "four-lug" embodiment of FIG. 3, the cap portion 53 is rotated about 45°.)

After the openings 67, 69 are thus aligned, the tapered end 63 of the rod 61 (with no snap ring 65 mounted thereon) is inserted through the opening 69 until it contacts the snap ring 65 in the pocket 73. The outward end 77 of the rod 61 is then driven inward (using, for example, a drift tool and hammer) until the snap ring 65 lodges in the groove.

So placed, the rod 61 prevents significant relative motion between the cap portion 53 and the clevis device 29. While the snap ring 65 prevents the rod 61 from working its way out of the openings 67, 69, such rod 61 can be readily freed of the snap ring 65 and driven out by means described above.

Considering FIG. 5, the pivot pin 31 has first and second exposed ends 79 and 81 and unless restrained, such pin 31 may move left or right. For pins 31 which can "escape" in either of two directions, the new structure 10 is most beneficial when used in pairs. That is, the retaining structure 10 includes first and second cap portions 53a, 53b adjacent to the pin first and second ends 79 and 81, respectively. The dimension between the covers 55 of the cap portions is about equal to or slightly greater than the length of the pin 31. In the latter instance, the pin 31 has limited freedom of movement between the cap portions 53a, 53b.

Referring next to FIGS. 13–18, another embodiment of the new structure 10 will be described. Such embodiment is something of an "inside out" version of the embodiment of FIG. 3.

In such structure 10, the ring-like body 33 has first retention members 35 which project radially inward toward the pin axis 37. The cap portion 53 has second retention members 49 which project radially outward away from the pin axis 37 and which fit between the first retention members 35 and the face 41 of the device 29.

The cap portion 53 has one or two tapped holes 83 therein so that (in the event of a heavy, hard-to-lift portion 53) a bolt or the like may be temporarily threaded to the portion 53 for use as a lifting and/or turning handle. And a lock pin may be threaded into one or both holes 83 and into corresponding hole(s) in the face 41 to keep the portion 53 from rotating. In other respects, the embodiments are closely similar.

Figure 19:
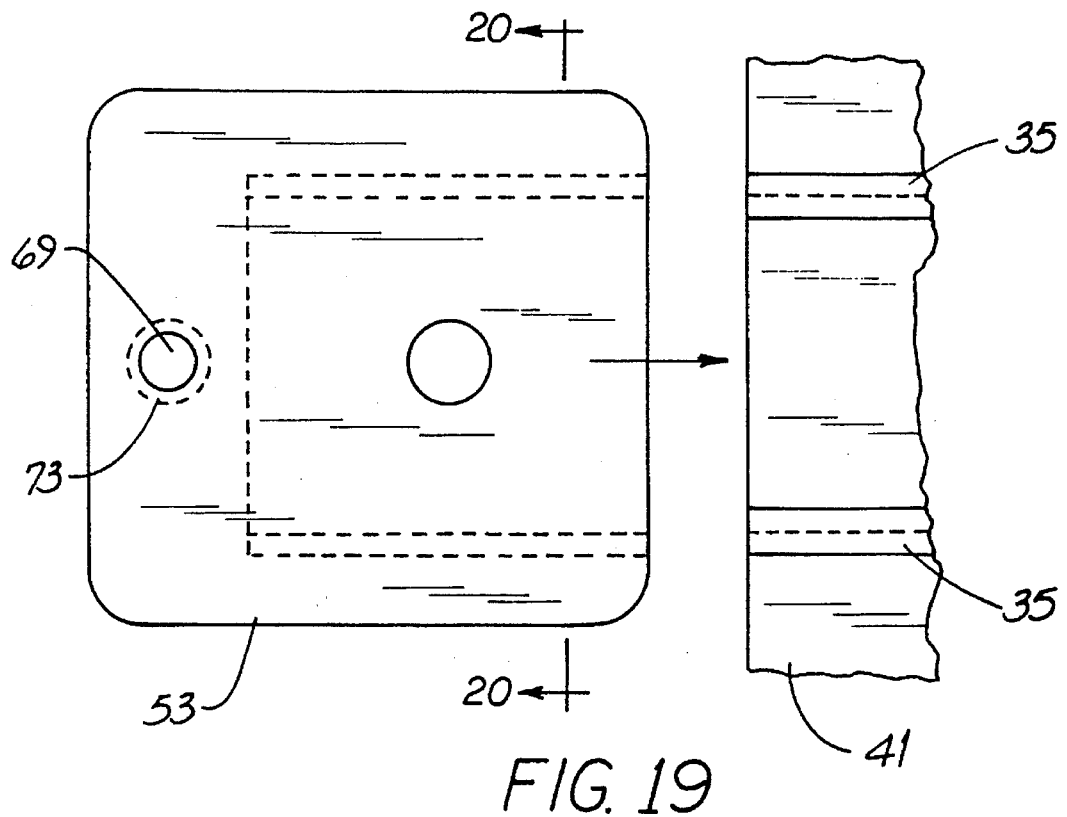
FIG. 19 is a plan view of yet another embodiment of the retaining structure. Surfaces of parts are shown in dashed outline.
Figure 20:
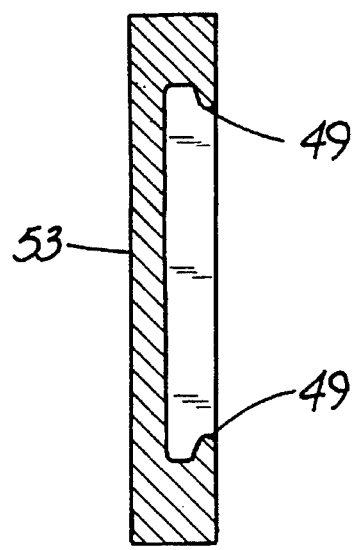
FIG. 20 is a section view of the cap portion of the embodiment of FIG. 19 taken generally along the viewing plane 20—20 thereof.

Referring next to FIGS. 19 and 20, yet another embodiment of the new structure 10 will be described. In this embodiment, the first retention members 35 are linear and rail-like. The cap portion 53 is mounted by placing its second retention members 49 against the face 41 and sliding such members 49 into engagement with the first retention members 35. When the openings 67, 69 are aligned, the rod 61 is extended into the portion 53 and the device 29 to prevent substantial relative movement between such portion 53 and device 29.

While the principles of the invention have been described in connection with specific embodiments, it is to be appreciated that such embodiments are exemplary and not limiting.

What is claimed:

1. In an apparatus having a device pivotably connected thereto by a pin and the apparatus includes a pin-retaining structure, the improvement wherein:

the pin has a cylindrical side wall and first and second opposing ends;

the device includes a plurality of separate arcuate first retention members which are circumferentially spaced from one another;

the structure includes a cap portion having a cover portion over the first end, thereby interfering with free axial travel of the pin, such cap portion having a plurality of second circumferentially spaced retention members, and wherein:

each second retention member engages a separate first retention member, whereby the pin is retained in engagement with the device and is weld-free.

2. The apparatus of claim 1 wherein:

the second retention members are circumferentially-spaced from one another;

the pin extends along an axis; and the first retention members project generally radially to the axis.

3. The apparatus of claim 2 wherein the first retention members project generally away from the axis and the second retention members project generally toward the axis and are in axially-overlapping engagement with the first retention members.

4. The apparatus of claim 3 wherein:

the cap portion is a first cap portion and is spaced from the pin first end;

the pin has a second end;

the apparatus includes a second cap portion spaced from the pin second end; and the apparatus further includes a separate locking component engaging each cap portion.

5. The apparatus of claim 2 wherein the first retention members project generally toward the axis and the second retention members project generally away from the axis and are in axially-overlapping engagement with the first retention members.

6. The apparatus of claim 1 wherein the first retention members are spaced along the circumference of a first circle.

7. The apparatus of claim 6 wherein the second retention members are spaced along the circumference of a second circle having a diameter substantially equal to that of the first circle.

8. The apparatus of claim 1 wherein the pin has a second end, the cap portion is a first cap portion, the apparatus includes a second cap portion having a cover over the second end and the apparatus further includes a separate locking component engaging each cap portion and preventing substantial movement of the cap portions.

9. The apparatus of claim 1 wherein:

the pin has a second end and a length;

the cap portion is a first cap portion mounted adjacent to the first end;

the apparatus includes a second cap portion mounted adjacent to the second end and spaced from the first cap portion by a dimension; and the dimension is slightly greater than the length of the pin, whereby the pin has limited freedom of movement between the cap portions.

10. In combination, a dragline bucket and a clevis device pivotably connected thereto by a pin and the combination includes a pin-retaining structure, the improvement wherein:

the structure is free of weld;

the device includes a face and first and second pin bushings mounted in the device;

the pin is received in the pin bushings;

the structure includes a generally-circular body on the face and having a plurality of first separate arcuate circumferentially spaced retention members protecting therefrom and radially-spaced from the first pin bushing;

the structure includes a cap portion over the first pin bushing and interfering with free axial travel of the pin, such cap portion having a plurality of separate arcuate circumferentially spaced second retention members, each second retention member engaging a separate first retention member; and a locking component extends into the device and the cap portion, thereby preventing substantial rotational movement of the cap portion, whereby the pin is retained in the bushings.

11. A method for retaining a pin on an apparatus having a device pivotably coupled thereto by such pin, the method including the steps of:

providing a device having a plurality of first retention members spaced from a device surface;

providing a cap portion having a plurality of second retention members; and rotatably positioning a separate second retention member between each first retention member and the surface, thereby retaining the pin in engagement with the device.

12. The method of claim 11 wherein the positioning step includes rotating the cap portion with respect to the device.

13. The method of claim 12 further including the step of engaging the cap portion with a locking component, thereby preventing substantial movement of the cap portion with respect to the device.

14. The method of claim 11 further including the step of engaging the cap portion with a locking component, thereby preventing substantial movement of the cap portion with respect to the device.

15. In an apparatus having a device pivotably connected thereto by a pin and the apparatus includes a pin-retaining structure, the improvement wherein:

the pin has first and second ends and a length;

the device includes a plurality of separate circumferentially spaced arcuate first retention members;

the structure includes a first cap portion mounted adjacent to the first end and interfering with free axial travel of the pin, such first cap portion having a plurality of separate arcuate circumferentially spaced second retention members;

each second retention member engages a separate first retention member;

the apparatus includes a second cap portion mounted adjacent to the second end and spaced from the first cap portion by a dimension; and the dimension between the cap portions is slightly greater than the length of the pin, whereby the pin has limited freedom of movement between the cap portions.

16. The apparatus of claim 15 wherein the first retention members are circumferentially-spaced from one another and project generally away from the axis and the second retention members are circumferentially-spaced from one another and project generally toward the axis and interlock with the first retention members.

* * * * *